June 15, 1954   G. H. BROWNE ET AL   2,681,035
AUTOMATIC CONTROL MECHANISM IN STRAND MAKING MACHINE
Filed July 25, 1951
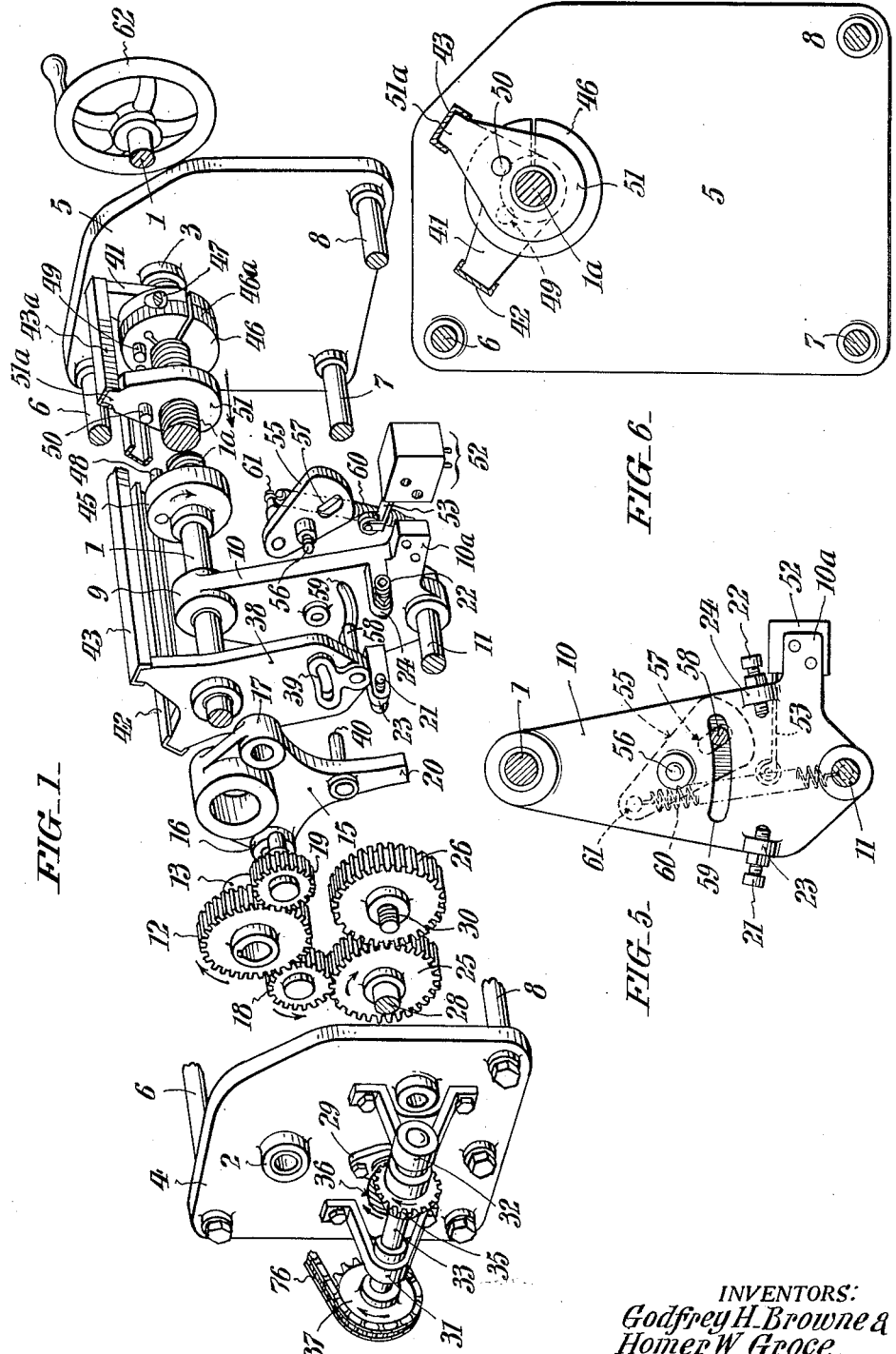
INVENTORS:
*Godfrey H. Browne &
Homer W. Groce,*
BY
ATTORNEYS.

June 15, 1954     G. H. BROWNE ET AL     2,681,035
AUTOMATIC CONTROL MECHANISM IN STRAND MAKING MACHINE
Filed July 25, 1951     4 Sheets-Sheet 2
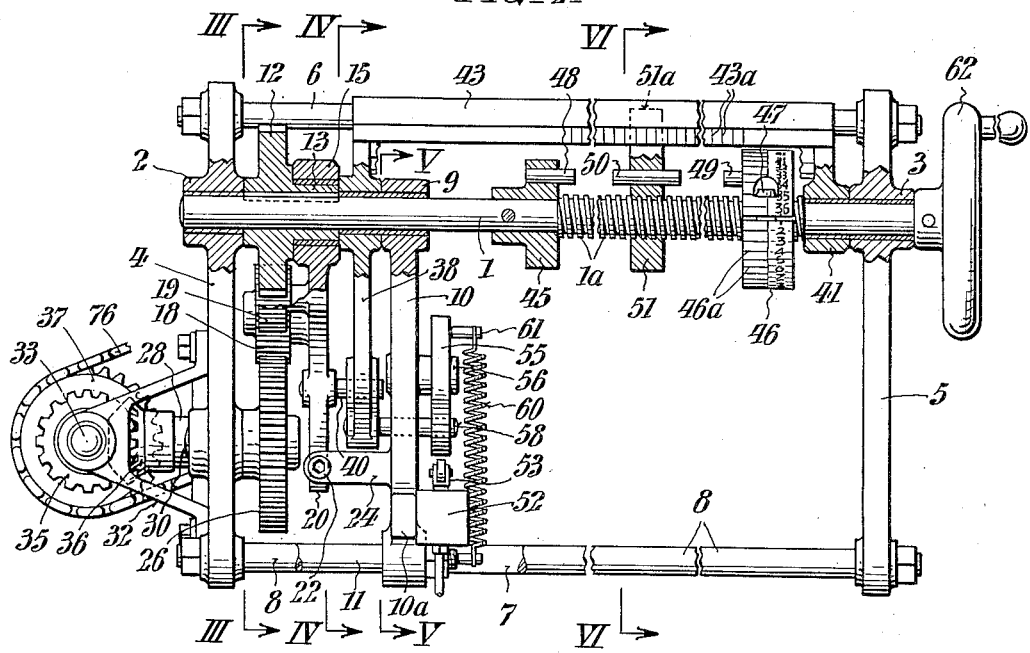
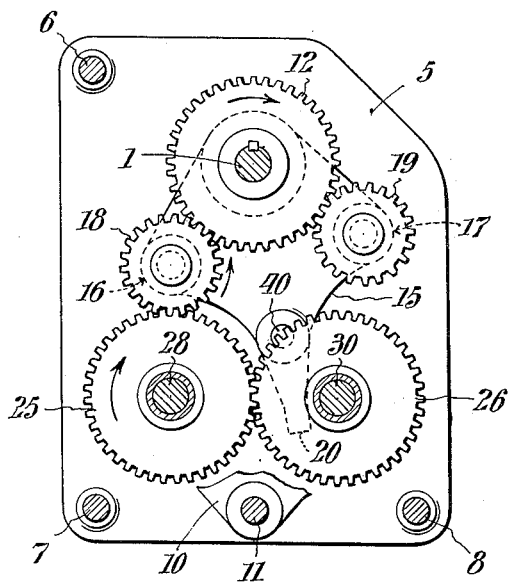
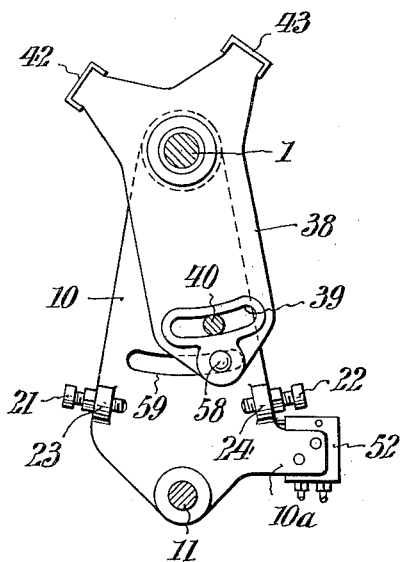
INVENTORS:
Godfrey H. Browne &
Homer W. Groce,
BY Paul & Paul
ATTORNEYS.

June 15, 1954   G. H. BROWNE ET AL   2,681,035
AUTOMATIC CONTROL MECHANISM IN STRAND MAKING MACHINE
Filed July 25, 1951   4 Sheets-Sheet 3
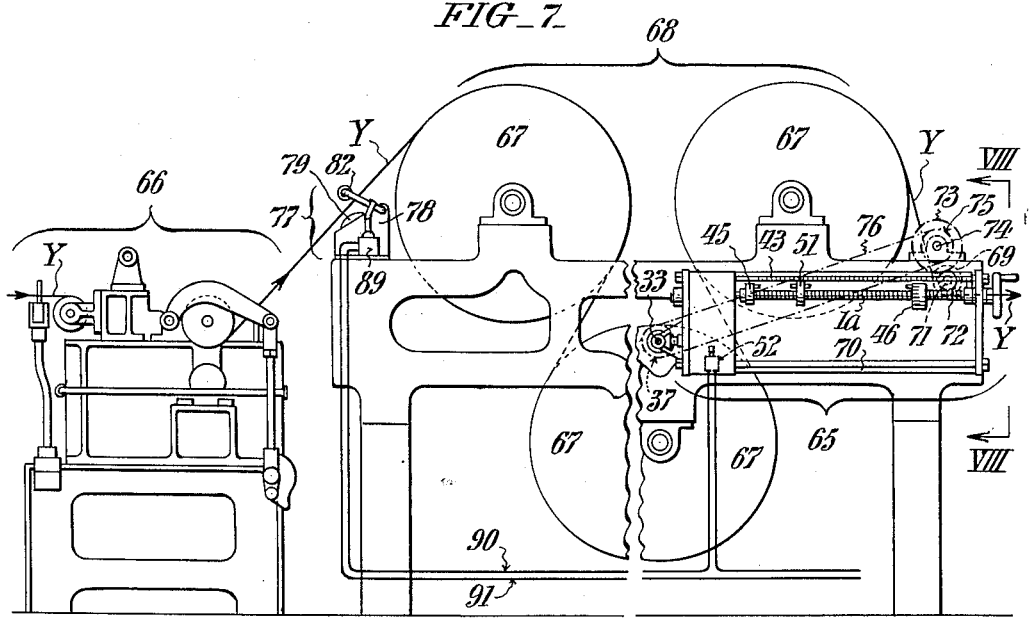
FIG_7
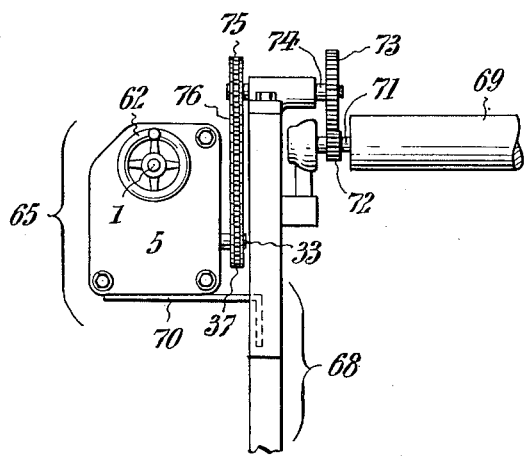
FIG_8
INVENTORS:
Godfrey H. Browne &
Homer W. Groce,
BY Paul & Paul
ATTORNEYS.

June 15, 1954 G. H. BROWNE ET AL 2,681,035
AUTOMATIC CONTROL MECHANISM IN STRAND MAKING MACHINE
Filed July 25, 1951 4 Sheets-Sheet 4
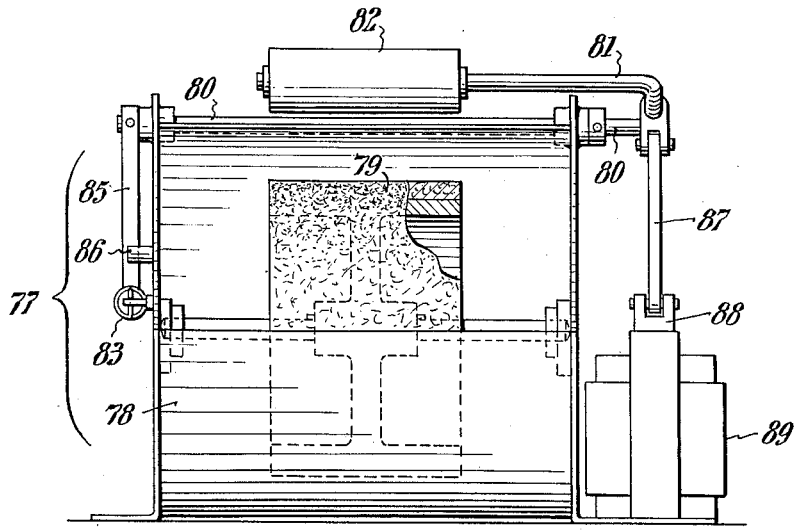
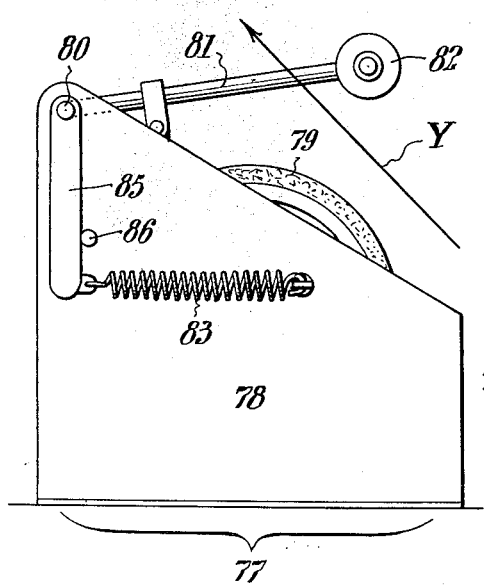
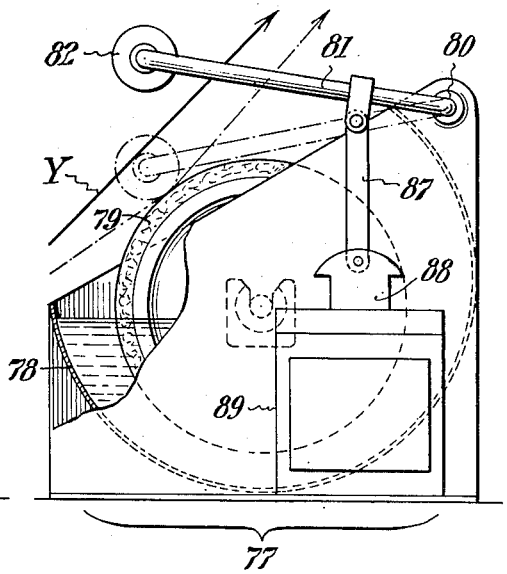
INVENTORS:
Godfrey H. Browne &
Homer W. Groce,
BY
Paul & Paul
ATTORNEYS.

Patented June 15, 1954

2,681,035

UNITED STATES PATENT OFFICE 2,681,035

AUTOMATIC CONTROL MECHANISM IN STRAND MARKING MACHINE

Godfrey H. Browne and Homer W. Groce, Gastonia, N. C., assignors to Cocker Machine & Foundry Company, Gastonia, N. C., a corporation of North Carolina Application July 25, 1951, Serial No. 238,558

11 Claims. (Cl. 118—11)

This invention relates to automatic control mechanism, useful in connection with various types of machines or apparatus to determine periodical functioning of incorporated parts or devices. In certain forms of embodiment such as the one herein disclosed, our improved automatic control mechanism is especially adapted for use in connection with textile machines and the like for controlling intermittent actuation of marking devices by which spot or transverse line imprints are impressed, in definitely spaced relation, upon running strand or sheet material for guidance in subsequently cutting the material to desired lengths, or for other purposes.

The chief aim of our invention is to provide an automatic control means suitable for purposes such as above mentioned, which is simple in construction; which is reliable in operation; and which is easily and quickly adjusted to function periodically between wide limits without the necessity for changing gears or other complicated parts.

In connection with control mechanism having the foregoing attributes, we further aim to provide facilities whereby such mechanism is powered from a rotating part of the machine or apparatus with which it is associated; and also to provide improved gauging means whereby the mechanism can be accurately pre-set to function at definite prescribed intervals, for example, when used in connection with a textile machine, to cause imprints to be made by a marking device at recurrent intervals corresponding to definite lengths of the strand or sheet material.

Other objects and attendant advantages will appear from the following detailed description of the attached drawings, wherein:

Fig. 1 is an exploded view in perspective showing our improved control mechanism.

Fig. 2 is a view showing the mechanism partly in elevation and partly in longitudinal section.

Figs. 3, 4, 5 and 6 are transverse sectional views taken as indicated respectively by the arrows III—III, IV—IV, V—V, and VI—VI in Fig. 2.

Fig. 7 is a view in side elevation of a textile machine in the form of a slasher with means for printing crosswise lines on the running yarns at predetermined intervals, arranged to be controlled by the control mechanism of our invention.

Fig. 8 is a fragmentary view in end elevation looking as indicated by the angled arrows VIII—VIII in Fig. 7.

Figs. 9 and 10 show the opposite end views of the printing device associated with the slasher; and Fig. 11 shows the front elevation of the printing device.

As illustrated in Figs. 1–6, our improved automatic control mechanism is characterized by having a spindle 1 whereof the opposite ends are journaled in bearings 2 and 3 afforded by two laterally-spaced plate-like main frame members 4 and 5 which are rigidly connected by a plurality of suitably-arranged tie bars 6, 7 and 8. The spindle 1 is further supported in the boss 9 of an intermediate frame member 10 which, at the bottom, is rigidly connected to the main frame member 4 by a shorter tie bar 11. Affixed to spindle 1, immediately adjacent the inner face of main frame member 4, is a spur gear wheel 12; and freely fulcrumed on a hub extension 13 of spur wheel 12 is a pendent rocker arm 15 with laterally projecting stud carrying bosses 16 and 17 for a pair of spur pinions 18 and 19 which are in constant mesh with said spur wheel. The swing of arm 15 is limited through engagement of a projection 20 at the lower end thereof alternately with adjustable stop screws 21, 22 in spaced lugs 23, 24 on intermediate frame member 10. As arm 15 is rocked in a manner later on explained, the pinions 18 and 19 are brought into or out of engagement respectively with a pair of constantly meshing spur gear wheels 25, 26, whereof the first is secured to a shaft 28 with rotative support in another bearing 29 on main frame member 4, and whereof the second is rotatively free on a stud 30 anchored in said member. Journaled in outwardly projecting bearing brackets 31, 32 on frame member 4 is a transverse shaft 33 which, through a pair of miter gears 35, 36, imparts rotary motion to shaft 28. In order that shaft 33 may be driven from a constantly rotating shaft of the machine or apparatus with which the mechanism is used as also later on explained, we have provided it at one end with a sprocket wheel 37.

Disposed between rocker arm 15 and the intermediate frame member 10 and freely fulcrumed on spindle 1, is another rocker arm 38 whereof the lower portion has an arcuate slot 39 into which extends a lateral stud projection 40 adjacent the bottom end of rocker arm 15. The upper portion of rocker arm 38 is bifurcated; and extending between the bifurcations and the bifurcations of a generally similar rocker arm 41 free on spindle 1 immediately adjacent the inner face of main frame member 5, are channel bars 42 and 43. As shown, these channel bars 42, 43 engage downwardly over oppositely disposed lateral lug projections on arms 38 and 41 to which they are rigidly secured by rivets or bolts. The portion of spindle 1 between frame members 5 and 10 is threaded as at 1a, and fixedly secured to said portion adjacent one end thereof is a collar 45. Spaced from the collar 45 and adjustable along the threaded portion 1a of spindle 1 is a split collar 46 which is securable in adjusted positions by a clamp screw 47. Extending laterally from the inner faces of the collars 45 and 46 are eccentrically-arranged studs 48 and 49 which are adapted to be engaged by the opposite ends of an eccentrically-arranged stud 50 on a follower nut element 51 mounted upon the threaded portion 1a of spindle 1. At its top, the nut element 51 has a tooth 51a which fits slidingly into the hollow of channel bar 43.

Supported on a lateral projection 10a adjacent the bottom end of frame member 10 is a normally open-electric switch 52 which has a roller at the end of its actuating arm 53 in the path of a cam element 55 swingable about a stud 56 on said frame member 10. Below its fulcrum, the cam element 55 has a vertical slot 57 engaged by a stud 58 which extends through an arcuate clearance slot 59 in intermediate frame member 10, from the bottom end of rocker arm 38. A toggle spring 60, in tension between the diametrically-reduced inner end extension of the tie rod 11 and a stud projection 61 on cam element 55 above the fulcrum axis of the latter, serves to hold said element yieldingly in either of the two positions to which it may be shifted. For a purpose also later explained, the adjustable clamp collar 46 is provided with circumferential graduations 46a for coordination with scale graduations 43a along the channel bar 43 overlying the threaded portion 1a of spindle 1. When necessary or desired, spindle 1 can be turned by means of the hand wheel indicated at 62.

Operation

Let it be assumed that shaft 33 is being driven clockwise in Fig. 1, and that the parts are positioned as illustrated with pinion 18 engaging spur wheel 25. Under these conditions spindle 1 will be rotated in the direction of the arrow and the follower nut 51 thereby caused to travel toward collar 46. Upon eventual engagement of pin 50 of nut element 51 with the stud 49 of collar 46, the arms 38 and 41 will be swung clockwise about spindle 1 due to engagement of the tooth 51a projection of said nut element within the hollow of the connecting channel bar 43, until arrested by contact of the bottom projection 20 of arm 15 with the stop 21 on intermediate frame member 10. As arm 15 is thus moved, the stud projection 40 thereon causes cam element 55 to be swung in the opposite direction past dead center, the movement thus initiated being completed through the assistance of spring 60. By such actuation of the cam element 55, the switch 52 will be momentarily closed as will be readily understood. At the same time, through engagement of one end of the slot 39 in arm 38 with the stud projection 40 of arm 15, arm 38 will be swung leftward in Fig. 1 with resultant disengagement of pinion 18 from spur wheel 25 and engagement of pinion 19 with spur wheel 26. The drive of the spindle 1 will then be in the opposite or counterclockwise direction. Under these conditions, nut element 51 will travel away from collar 45 toward collar 46, and upon ultimate approach to the latter and engagement of stud 50 by stud 49 on collar 46, will be swung rightward with consequent incidental momentary actuation of switch 52 through the same parts as before and reversal again in the drive of spindle 1. This operation will be discontinuously repeated with lapse of a definite time interval during each traverse of the follower nut element 51. This time interval can of course, be lengthened or shortened between wide limits by adjusting the collar 46 forwardly or backwardly along spindle 1, the traverse period being accurately determinable through coordination of the graduations 46a on said collar with the graduations of the scale 43a on channel bar 43.

The mechanism of our invention can obviously be used to carry out any operation which must be repeated at regular recurrent intervals. As hereinbefore pointed out, it can be advantageously employed in connection with textile or other machinery to control a device for spot or line marking running sheet or strand material at intervals, for subsequent cutting to definite lengths or for other purposes. A typical instance of such use is illustrated in Figs. 7 and 8 wherein the mechanism is comprehensively designated by the numeral 65 and shown as associated with a textile machine in the form of a slasher. Here the sheet of warp yarns Y, after being run through a size-applying unit 66, passes successively about a group of revolving heated cylinders 67 of a drying unit 68, and are finally drawn off, en route to a collecting beam (not illustrated), by a delivery roll 69 after well known practice in the textile art. As shown, the mechanism 65 is supported by a bracket 70 attached to one of the side frames of the drying unit 68 at the rear end of the latter. The mechanism 65 is powered from the shaft 71 of draw off roll 69 (Figs. 7 and 8) through gearing including a spur pinion 72 on said shaft in mesh with a spur wheel 73 at the inner end of a transversely-arranged countershaft 74 which is rotatively supported in a fixed bearing on the side frame of unit 68. Affixed to the outer end of countershaft 74 is a sprocket wheel 75 which, by means of a chain 76, is connected to the sprocket wheel 37 on shaft 33 of the timing mechanism. The printing device to be controlled is generally designated by the numeral 77 in Fig. 7, and shown as mounted transversely of the front end of the framework of drying unit 68, said device comprising, see Figs. 9–11, a trough 78 containing a suitable printing fluid in which a freely-revolvable circumferentially-padded applicator roll 79 runs partly submerged. Journaled in the end walls of trough 78 is a shaft 80 which, at one end, is formed with a crank arm 81 carrying a printing roll 82 of smaller diameter in parallel relation to the applicator roll 79. Under the pull of a spring 83, an arm 85 at the opposite end of shaft 80 is yieldingly maintained in engagement with a fixed stop 86, and the printing roll 82 is thereby normally held elevated out of contact with applicator roll 79. By means of a link 87, the crank arm 81 is coupled with the armature 88 of an operating solenoid 89 fixedly supported at one end of trough 78 with its coil interposed in circuit with switch 52 of the timing device 65, the conductors of the circuit in which the switch 52 and the coil of the solenoid are interposed being designated by the numerals 90 and 91. It is to be noted that the printing device 77 is so positioned that the warps Y normally pass through the clearance interval between the applicator and printing rolls 79 and 82, free of contact with either of the latter. Accordingly, at each actuation of the timing device 65 with attendant closing of the switch 52, the solenoid 89 is energized and causes printing roll 82 of device 77 to press the warps Y momentarily into contact with the applicator roll 79 as shown in broken lines in Fig. 9.

In practice, the collar 46 of the control mechanism may be provided for example with thirty-six equally-spaced graduations 46a to correspond to inch lengths of the warps, and the graduations 43a on the scale of channel bar 43 spaced uniformly in correspondence with the spacing of the graduations on said collar to indicate yard lengths of the warps, each such graduation representing a complete revolution of spindle 1. With the parts so proportioned, the time intervals between successive actuations of the mechanism can be changed to effect, by means of the printing device, marking of the warps at three inch intervals up to any distance within the length of spindle 1 by adjusting the collar 46 to different positions along said spindle, the frequency of the markings being accurately determinable through proper coordination of the graduations 46a on said collar with those on the bar scale 43a, as will be readily understood.

It will thus be seen that our improved automatic control mechanism is advantageous by virtue of its simplicity and the ease with which it can be adjusted, without the necessity for gear changing as was ordinarily the case with most timing devices heretofore designed to serve in a generally similar capacity.

Having thus described our invention, we claim:

1. In automatic control mechanism, a screw spindle; spaced collars set upon the spindle; a follower nut element adapted to traverse the spindle in the interval between the collars; a pair of driven intermeshing spur wheels constantly rotated about parallel axes in spaced relation to the spindle; a spur wheel affixed to the spindle; an arm freely fulcrumed on the spindle; a pair of spur pinions carried by the arm and meshing with the spur wheel on the spindle; interposed instrumentalities operated, upon engagement of the follower nut element with the individual collars, to swing the arm first in one direction and then in the other, and so cause the spur pinions to alternately mesh respectively with corresponding spur wheels of the aforementioned pair in effecting reversals in the rotation of the spindle; and an element actuated by the arm each time the latter is so moved.

2. Automatic control mechanism according to claim 1, wherein the actuated element is in the form of an electric circuit-governing switch.

3. In automatic control mechanism, a screw spindle; reversible drive means for the spindle; spaced collars set upon the spindle; a follower nut element adapted to traverse the spindle in the interval between the collars; arms freely fulcrumed on the spindle adjacent opposite ends thereof, a longitudinal bar rigidly connecting the two arms and having a longitudinal groove therein on which a projection on the nut element slidingly fits, whereby, upon engagement of the nut element with one of the collars, the arms are swung in one direction during rotation of the spindle in one direction, and upon engagement of the nut element with the other collar, the arms are swung in the opposite direction during reverse rotation of the spindle; means actuated through movement derived from the arms each time the latter are swung as aforesaid to effect reversals of the drive means; and an element simultaneously actuated, likewise through movement derived from the arms, at each drive reversal.

4. Automatic control mechanism according to claim 3, wherein the follower nut element has lateral projections at opposite sides thereof adapted to cooperate alternately with corresponding lateral projections on the collars in initiating the spindle reversals.

5. Automatic control mechanism according to claim 3, wherein one of the collars is adjustable along the spindle.

6. Automatic control mechanism according to claim 3, wherein one of the collars is adjustable along the spindle; and wherein the adjustable collar is provided with circumferential graduations for coordination with scale graduations on the bar uniting the two arms.

7. Automatic control mechanism according to claim 3, wherein the control means is in the form of an electric circuit-governing switch.

8. In automatic control mechanism, a screw spindle; reversible drive means for the spindle; spaced collars set upon the spindle; a follower nut element adapted to traverse the spindle in the interval between the collars; arms freely fulcrumed on the spindle adjacent opposite ends thereof, a longitudinal bar rigidly connecting the two arms and having a longitudinal groove therein on which a projection on the nut element slidingly fits, whereby, upon engagement of the nut element with one of the collars, the arms are swung in one direction during rotation of the spindle in one direction, and upon engagement of the nut element with the other collar, the arms are swung in the opposite direction during reverse rotation of the spindle; means actuated through movement derived from the arms each time the latter are swung as aforesaid to effect reversals of the drive means; a pivoted spring-biased toggle cam element operated through movement derived from the arms at each drive reversal; and an electric circuit-governing switch momentarily actuated by said toggle cam element.

9. Automatic control mechanism, according to claim 8 for controlling operation of a spot marking device having a normally retracted printing member and magnetic actuating means for moving the printing member momentarily into contact with running strand or sheet material, wherein the switch of said mechanism is interposed in circuit with the magnetic actuating means of the marking device.

10. Automatic mechanism for controlling the operation of a normally retracted member with magnetic actuating means for spot printing strand or sheet material running through a machine having a rotating shaft, said mechanism comprising a screw spindle; spaced nut collars engaged upon the spindle; a follower nut element adapted to traverse the spindle between the collars; a pair of driven intermeshing spur wheels constantly rotated about parallel axes in spaced relation to the spindle; a spur wheel affixed to the spindle; an arm freely fulcrumed on the spindle; a pair of spur pinions carried by the arm and meshing with the spur wheel on the spindle; interposed instrumentalities operated, upon engagement of the follower nut element with the individual collars, to swing the arm first in one direction and then in the other and thereby cause the spur pinions to alternately mesh respectively with corresponding spur wheels of the aforementioned pair in effecting reversals in the rotation of the spindle; and a governing switch in circuit with the magnetic actuating means of the printing member aforesaid.

11. Automatic mechanism for controlling the operation of a normally retracted member with magnetic actuating means for spot printing strand or sheet material running through a machine having a draw-off roller, said mechanism comprising a screw spindle; spaced nut collars engaged upon the spindle; a follower nut element adapted to traverse the spindle between the collars; a pair of driven intermeshing spur wheels constantly rotated about parallel axes in spaced relation to the spindle; a spur wheel affixed to the spindle; an arm freely fulcrumed on the spindle; a pair of spur pinions carried by the arm and meshing with the spur wheel on the spindle; interposed instrumentalities operated, upon engagement of the follower nut element with the individual collars, to swing the arm first in one direction and then in the other and thereby cause the spur pinions to alternately mesh respectively with corresponding spur wheels of the aforementioned pair in effecting reversals in the rotation of the spindle; connections whereby one of the pair of spur wheels is driven from the draw-off roll of the machine; and a governing switch in circuit with the magnetic actuating means for the printing members aforesaid.

References Cited in the file of this patent
UNITED STATES PATENTS

| Number | Name | Date |
|---|---|---|
| 882,283 | Wolf | Mar. 17, 1908 |
| 1,677,927 | Pettee | July 24, 1928 |
| 1,804,200 | Brouse | May 5, 1931 |
| 1,904,254 | Scrantom | Apr. 18, 1933 |
| 1,937,473 | Geary | Nov. 28, 1933 |
| 2,128,709 | Kramer | Aug. 30, 1938 |
| 2,387,867 | Adams | Oct. 30, 1945 |
| 2,523,757 | Goldstein | Sept. 26, 1950 |